United States Patent Office 3,412,794
Patented Nov. 26, 1968

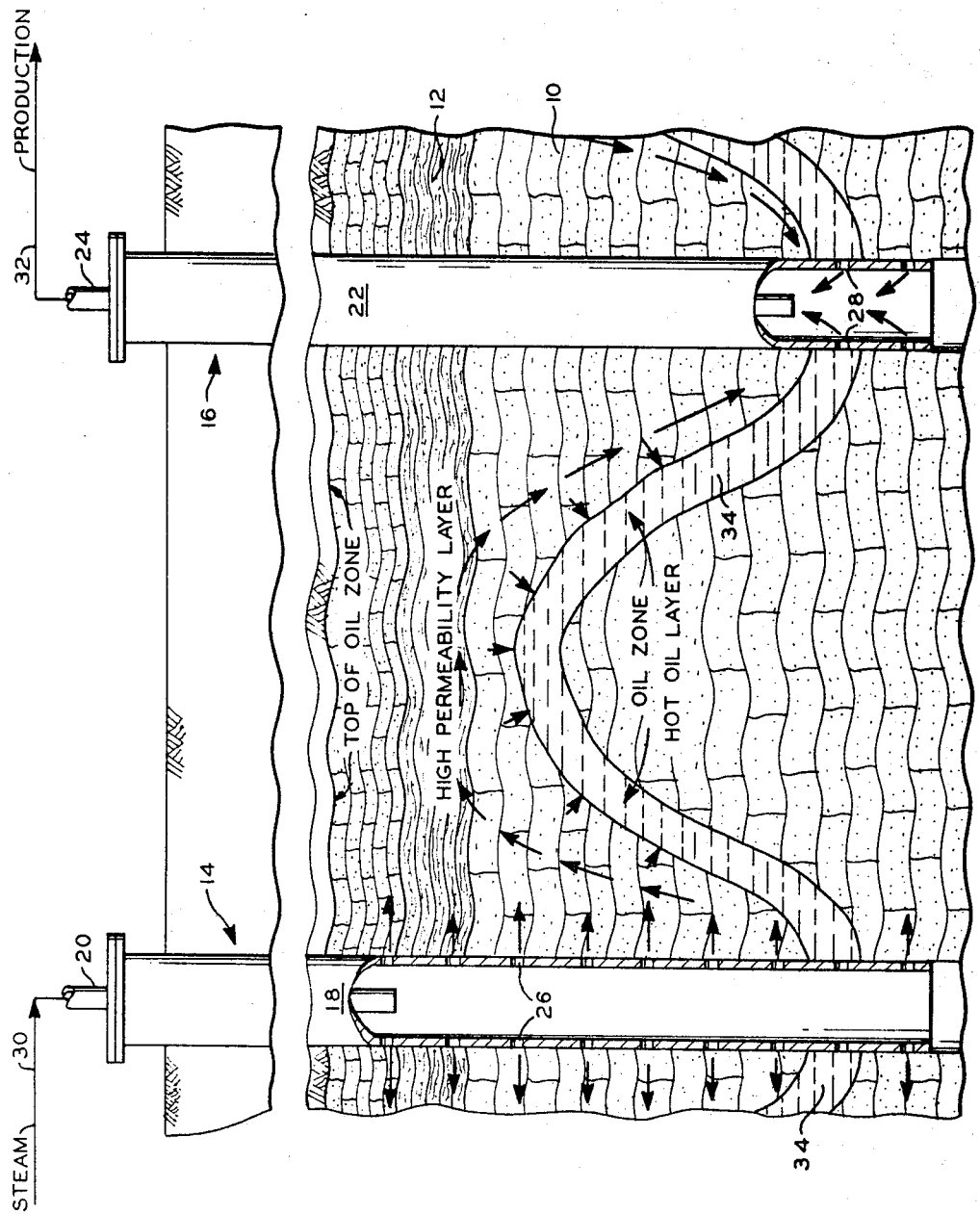

3,412,794
PRODUCTION OF OIL BY STEAM FLOOD
Emery M. Craighead, Bartlesville, Okla., assignor to Phillips Petroleum Company, a corporation of Delaware
Filed Nov. 23, 1966, Ser. No. 596,559
7 Claims. (Cl. 166—11)

ABSTRACT OF THE DISCLOSURE

Oil is produced from an oil stratum containing an upper level high permeability zone and penetrated by an injection well and a production well by injecting steam thru said injection well into said stratum while restricting flow into said production well to a lower level of the stratum to force steam and oil thru the stratum below the high permeability zone. A noncondensible gas such as natural gas, carbon dioxide, combustion gas and the like may be injected with, or sequential to, the steam, the noncombustible gas being caused to enter the high permeability zone to lower the zone's thermal conductivity, thereby reducing heat loss from this zone.

---

This invention relates to a process for the production of oil by steam flood as applied to an oil stratum containing an upper level zone of relatively high permeability compared to the remaining oil stratum.

It is conventional technique in the oil industry to produce an oil stratum by driving steam thru the stratum from an injection well to one or more production wells penetrating the stratum. Some oil strata contain horizontal streaks of comparatively high permeability which allow the steam to selectively penetrate such streaks to the substantial exclusion of the steam from the areas of lower permeability lying above and below the high permeability streak or zone. This problem of selective steam penetration of the high permeability zone interferes with the production of oil from the remaining oil stratum.

This invention is concerned with a method or process for producing oil from an oil stratum containing a relatively thin horizontal layer or zone of high permeability compared to the thicker deposit of lower permeability subjacent the high permeability zone, using principally steam as the driving agent.

Accordingly, it is an object of the invention to provide a steam flood process for producing oil from an oil stratum containing an upper-level horizontal zone or streak of substantially higher permeability than the remainder of the stratum. Another object is to provide a steam flood process in such an oil stratum which conserves heat by reducing the loss of heat to the overburden. Other objects of the invention will become apparent to one skilled in the art upon consideration of the accompanying disclosure.

A broad aspect of the invention as applied to an oil stratum penetrated by an injection well and an offset production well and containing an upper-level horizontal layer, streak, or zone of higher permeability than the permeability of the subjacent oil stratum, comprises injecting steam into said stratum thru said injection well so as to displace oil toward said production well while restricting fluid flow into said production well to a lower level of the stratum, and producing fluids, including oil, from the production well at a controlled rate to avoid any substantial production of steam, thereby penetrating the high permeability zone successively with cold water, hot water, and steam floods, heat from steam in said zone causing formation of a hot oil layer subjacent said zone migrating downwardly with oil therein moving from said layer into the production well. Steam is generally injected simultaneously across the entire face of the oil stratum exposed to the injection well and it is essential to the invention to open the production well only at a level considerably lower than the level of the high permeability zone and preferably adjacent the bottom of the oil stratum.

A more complete understanding of the invention may be had by reference to the accompanying schematic drawing which represents an elevation thru an oil stratum penetrated by an injection well and a production well.

Referring to the drawing, oil stratum 10 containing a high permeability layer 12 is penetrated by an injection well 14 and a production well 16. Well 14 is provided with a casing 18 and a tubing string 20 while well 16 is provided with a casing 22 and a production tubing 24 which may connect with a pump on the lower end. Casing 18 is perforated in conventional manner at different levels as at 26. Casing 16 is perforated only along the lower end thereof as at 28. A steam line 30 connects with injection tubing 20 and a production line 32 connects with production tubing 24. Steam line 30 is connected with a steam boiler or generator (not shown) while production line 32 leads to conventional processing equipment (not shown).

It is to be understood that well 14 may be one of a ring of injection wells surrounding a central well 16 or it may be one of a line of wells lying between parallel lines of production wells 16. At the stage of operation indicated in the drawing, 34 represents a layer of hot oil extending substantially from the injection well to the production well and migrating downwardly with continued steam injection and progression of heat into the oil stratum below layer 12, with hot oil in layer 34 flowing toward production well 16.

Operation in accordance with the invention comprises injecting steam at a temperature in the range of about 450 to 800° F. and at a pressure in the range of 500 to 3000 p.s.i.g. from steam line 30 into injection tubing 20 and well 14, causing flow of steam into the oil stratum thru perforations 26 as shown by arrows in the drawing. Because of the higher permeability of zone 12 than that of the adjacent stratum, steam selectively penetrates zone 12, causing condensation of steam with a hot water front being pushed into this zone. Because of the hot water passing into a colder area of zone 12 as it moves toward well 16, this water becomes cold as it is pushed thru the zone and is followed by additional condensate which is hot at the interface of the steam and hot water phases. In oil reservoirs containing water, interstitial water is driven ahead of the condensate. As the sand or rock becomes heated adjacent well 14, a steam phase is maintained and, with continued steam injection, is expanded and driven thru the high permeability zone 12 toward production well 16. Since the only outlet for produced fluids is thru perforations 28 at a low level in casing 22, there is a water drive followed by a steam drive toward the lower section of the stratum around well 16. Production of fluids thru well 16 must be at a rate sufficient to form a generally inverted conical zone of production around the production well as shown in the drawing, but with little or no steam being produced. During steam injection up to this point in the process, a hot oil layer 34 has been developing as shown.

High permeability zone 12 acts as a gas-filled zone when it is heated sufficiently to maintan steam therein. The boundary between the steam in this zone and the underlying oil acts as a free liquid surface. The oil, being subjected to the steam pressure, tends to flow radially away from the injection well toward the region of lower pressure adjacent the production well. The layer of oil in contact with and adjacent the steam is substantially heated and thus measurably reduced in viscosity. The oil in this layer nearest the steam is forced toward the production well 16 at a higher rate than the cooler, more viscous oil in the underlying stratum. This creates a flow of hot oil along the boundary of the hot oil layer with the underlying steam zone. The hot oil zone is maintained by transfer of heat from the steam zone by (1) direct heat conduction thru the rock or sand matrix, and (2) by convection as steam condensate moves downward by gravity and heated oil moves upward by displacement. As continued production lowers the oil level in the stratum, the drainage of hot oil opens additional pore volume to the flow of steam which subjects residual oil to the effects of steam distillation as well as permitting steam to contact the surface of the rock or sand grains, thus reversing the wetability of oil-wet reservoirs and permitting surface-bound oil to be displaced.

With continued steam injection, oil layer 34 continues to migrate downwardly and tends to straighten out between the lower ends of wells 14 and 16 until most of the stratum below zone 12 has been produced. The thickness of the stratum below zone 12 which can be economically produced depends upon a number of factors but is primarily limited by the loss of heat to the overburden by conduction thru the sand or rock. In order to diminish this heat loss and increase the length of time steam heat may be applied economically to the entire oil zone, a non-condensible gas, such as natural gas (principally methane), $CO_2$, combustion gas, etc., is injected, along with or sequentially to the steam, into high permeability zone 12 where it rises to the top of this zone and even into the adjacent less permeable overlying oil zone as oil is produced therefrom to reduce the rate of heat conduction into the overburden. If the reservoir contains a sufficient amount of methane, such a layer will form naturally during the steam flooding. In reservoirs which lack sufficient methane for this purpose, a slug of non-condensible gas, preferably natural gas or methane, is injected with the steam or during steam interruption to form this protective layer.

Heat conductivity measurements on sandstone indicate a conductivity value of about 1.0 for sandstone saturated with water, whereas the conductivity for sandstone filled with dry gas is as low as 0.2. Although the injected non-condensible gas does not displace 100 percent of the liquid from the pore space in the upper section of zone 12 and the adjacent less permeable zone, it displaces a major portion of the liquid and thus substantially lowers the heat conductivity of the rock in which it is disposed.

Injection of non-condensible gas in admixture with steam is practiced in the early stages of the steam injection process, particularly during the establishment of a steam phase in zone 12.

In application of the invention to an oil stratum at a depth of about 2540′, averaging about 30′ thick, having an average permeability of about 500 millidarcies with a high permeability layer (1 to 5 darcies) about 8′ thick in its upper section, 5000 to 6000 pounds per day of steam at a pressure of about 650 p.s.i.g. are injected thru a central well surrounded by a ring of 4 production wells offset about 325′ therefrom. The injection well is perforated along substantially the entire face of the stratum and only the lower 4 feet of the production wells is perforated and open to flow. Dry natural gas is injected in admixture with the steam until an amount calculated to provide a layer of gas about 2.5′ thick in the high permeability layer within the well pattern, during the first 5 days of injection.

After an injection period of about 15 days, oil is pumped from the ring wells. Production thru the ring wells is controlled by sensing the temperature of the produced fluids and shutting in these wells when the temperature indicates steam production. Another indicator of too rapid production from the ring wells is a substantial increase in the ratio of water to oil produced.

The layer of natural gas within the high permeability layer serves as an insulation medium to minimize heat loss to the overburden. It also decreases the heat loss due to steam refluxing in this layer. It is estimated that the heat loss to the overburden is reduced by at least 50 percent.

Certain modifications of the invention will become apparent to those skilled in the art and the illustrative details disclosed are not to be construed as imposing unnecessary limitations on the invention.

I claim:

1. In a process for recovering oil from a subterranean oil-bearing reservoir, penetrated by at least two laterally spaced wells, said reservoir having a permeable zone superimposed on an oil bearing strata, the improvement comprising:
    (a) injecting steam into said oil bearing strata, causing the steam to rise therethrough into said superimposed permeable zone to saturate said zone;
    (b) maintaining said steam-saturated zone while injecting steam in said manner to displace oil from said oil bearing strata subjacent said permeable zone, said displaced oil migrating downwardly to form a production zone of generally sinusoidal configuration adjacent one of said wells;
    (c) withdrawing said displaced oil through one of said wells at a controlled rate to avoid substantial withdrawal of steam from said strata;
    (d) continuing the injection of said steam and the controlled withdrawal of said oil from said well to effect planishing of said production zone.

2. The process described in claim 1 in which the oil bearing strata is penetrated successively by cold water, hot water and steam.

3. The process as described in claim 1 in which a noncombustible gas is injected sequential to the steam.

4. The process as described in claim 1 in which a noncondensible gas is injected in admixture with steam.

5. The process as described in claim 1 in which a noncombustible gas is injected prior to the injection of steam.

6. The process as described in claim 1 in which displaced oil is withdrawn at a level lower than the level of the permeable zone.

7. The process as described in claim 6 in which displaced oil is withdrawn adjacent to the bottom of the oil stratum.

References Cited

UNITED STATES PATENTS

| | | | |
|---|---|---|---|
| 2,731,414 | 1/1956 | Binder et al. | 166—10 X |
| 2,734,578 | 2/1956 | Walter | 166—11 |
| 2,897,894 | 8/1959 | Draper et al. | |
| 3,129,758 | 4/1964 | Closmann | 166—11 |
| 3,155,160 | 11/1964 | Craig et al. | 166—40 |
| 3,269,460 | 8/1966 | Hardy et al. | 166—10 |
| 3,347,313 | 10/1967 | Matthews et al. | 166—11 |

STEPHEN J. NOVOSAD, *Primary Examiner.*